United States Patent [19]

Yamanouchi et al.

[11] Patent Number: 4,596,756

[45] Date of Patent: Jun. 24, 1986

[54] COPOLYMER MORDANT FOR PHOTOGRAPHIC DYES AND PHOTOGRAPHIC ELEMENT CONTAINING THE SAME

[75] Inventors: Junichi Yamanouchi; Yukio Sudo, both of Kanagawa, Japan

[73] Assignee: Fuji Photo Film Co., Ltd., Kanagawa, Japan

[21] Appl. No.: 614,596

[22] Filed: May 29, 1984

[30] Foreign Application Priority Data

May 27, 1983 [JP] Japan .................................. 58-94640

[51] Int. Cl.[4] .......................... G03C 5/54; C08F 20/44

[52] U.S. Cl. .................................... 430/213; 430/941; 525/326.7; 525/326.8; 525/327.1; 526/260; 526/263; 526/265; 526/297; 526/293

[58] Field of Search ................ 430/213, 941; 526/260, 526/263, 265, 297, 293; 525/326.7, 326.8, 327.1

[56] References Cited

U.S. PATENT DOCUMENTS

| | | | |
|---|---|---|---|
| 3,651,033 | 3/1972 | Armen et al. | 526/263 X |
| 3,958,995 | 5/1976 | Campbell et al. | 430/213 X |
| 4,463,080 | 7/1984 | Snow et al. | 430/213 |

FOREIGN PATENT DOCUMENTS

| | | | |
|---|---|---|---|
| 20317 | 2/1978 | Japan | 430/213 |

*Primary Examiner*—John E. Kittle
*Assistant Examiner*—Cynthia Hamilton
*Attorney, Agent, or Firm*—Sughrue, Mion, Zinn, Macpeak & Seas

[57] ABSTRACT

A photographic element having at least one layer containing a copolymer mordant having the repeating unit represented by the following general formula (I)

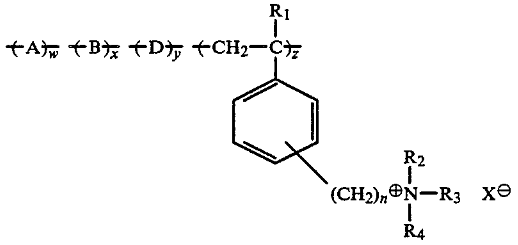

(I)

wherein A represents a monomer unit (copolymer component) derived from a copolymerizable monomer having at least two ethylenically unsaturated groups; B represents a monomer unit (copolymer unit) derived from a copolymerizable ethylenically unsaturated monomer represented by the following general formula (II)

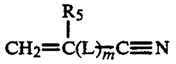

(II)

wherein $R_5$ represents a hydrogen atom or an alkyl group; L represents an alkylene group or an arylene group; and m is 0 or 1; D represents a monomer unit (copolymer component) derived from a copolymerizable ethylenically unsaturated monomer other than the monomer units shown by A and B and the monomer unit having component ratio z; $R_1$ represents a hydrogen atom or a lower alkyl group; $R_2$, $R_3$ and $R_4$, which may be the same or different, each represents an alkyl group or an aralkyl group, and at least two of $R_2$, $R_3$ and $R_4$ may combine to form a heterocyclic structure with a nitrogen atom; n represents an integer of from 1 to about 12; $X^{\ominus}$ represents an anion; w represents 0 to about 10 mol %; x represents from about 5 to about 90 mol %; y represents from 0 to about 80 mol %; and z represents from about 10 to about 95 mol %.

13 Claims, No Drawings

COPOLYMER MORDANT FOR PHOTOGRAPHIC DYES AND PHOTOGRAPHIC ELEMENT CONTAINING THE SAME

FIELD OF THE INVENTION

This invention relates to a novel copolymer which is a good mordant for photographic dyes and a photographic element containing the novel copolymer.

BACKGROUND OF THE INVENTION

In the photographic field, it is well known to use various kinds of polymers or copolymers as a mordant for preventing the transfer of dyes. Polymer mordants are disclosed in, for example, U.S. Pat. Nos. 3,898,088, 3,958,955, 4,131,469, and 4,147,548, West German Patent Application (OLS) No. 2,941,818 and Japanese Patent Application (OPI) No. 17352/81 (the term "OPI" as used herein refers to a "published unexamined Japanese patent application").

It has been found that when photographic prints containing dyes mordanted by the foregoing mordants are exposed to a fluorescent lamp, a mercury lamp or sunlight, the dyes thus mordanted undergo chemical change or decomposition. If the density of the dye images is reduced by the chemical change or decomposition of the dyes, the image quality of the photographic prints becomes very poor and, hence, the development of a technique for preventing the chemical change or decomposition of dyes has been desired.

SUMMARY OF THE INVENTION

An object of this invention is, therefore, to provide a photographic element containing a novel polymer mordant capable of preventing dyes or dye images from being chemically changed or decomposed by the action of light.

Another object of this invention is to provide a novel photographic element containing a polymer mordant having excellent capability to stably retain dyes.

The foregoing objects of this invention can be attained by the photographic element of this invention having on a support at least one layer containing a polymer mordant having the repeating unit represented by the following general formula (I)

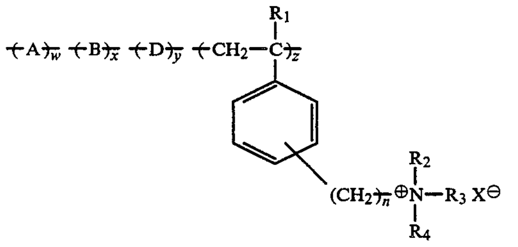

(I)

wherein A represents a monomer unit (a copolymer component) derived from a copolymerizable monomer containing at least two ethylenically unsaturated groups; B represents a monomer unit (a copolymer component) derived from a copolymerizable ethylenically unsaturated monomer represented by the following general formula (II)

$$CH_2{=}\underset{}{\overset{R_5}{\overset{|}{C}}}{-}(L)_m{-}C{\equiv}N \qquad (II)$$

wherein $R_5$ represents a hydrogen atom or an alkyl group; L represents an alkylene group or an arylene group; and m is 0 or 1; D represents a monomer unit (copolymer component) derived from another copolymerizable ethylenically unsaturated monomer than the monomer units shown by A and B and the monomer unit having component ratio z; $R_1$ represents a hydrogen atom or a lower alkyl group; $R_2$, $R_3$ and $R_4$, which may be the same or different, each represents an alkyl group or an aralkyl group, where at least two of $R_2$, $R_3$ and $R_4$ may combine with each other to form a heterocyclic structure with a nitrogen atom; n represents an integer of 1 to about 12; $X^\ominus$ represents an anion; w is 0 to about 10 mol%, x is about 5 to about 90 mol%, y is 0 to about 80 mol%, and z is about 10 to about 95 mol%.

DETAILED DESCRIPTION OF THE INVENTION

The copolymer having the repeating unit shown by general formula (I), with the exception of the case where w in general formula (I) is 0, is used as a water-dispersible polymer dispersion mordant (polymer latex mordant). The polymer dispersion can be used substantially as an aqueous solution as the mordants described in U.S. Pat. No. 3,958,995 and Japanese Patent Application (OPI) No. 145529/79, and does not require an organic solvent such as an alcohol, etc. Even when w in general formula (I) is 0, the copolymer shown by general formula (I) can be used as a water-dispersible polymer dispersion mordant, as much as the copolymer is oleophilic due to, for example, alkyl groups represented by $R_2$, $R_3$ and $R_4$ in general formula (I) whose total carbon numbers are large enough to impart oleophilic properties to the copolymer.

The mordants used in this invention will be described below in detail.

The term "the mordants used in this invention" described hereinafter is used to include polymer mordants (which may be used as a solution of an organic solvent or water) and polymer dispersion mordants used in this invention.

A in general formula (I) is, for example, a monomer unit derived from the monomer having the structure shown by the following general formula (III)

$$(CH_2{=}\overset{R_6}{\overset{|}{C}})_l Q \qquad (III)$$

wherein l is an integer of 2 or more, preferably 2 or 3; $R_6$ represents a hydrogen atom or a methyl group and Q represents a linkage group having from 1 to 20 carbon atoms, preferably 4 to 12 carbon atoms, such as an amido group (e.g., a sulfonamido group), an ester group (e.g., a sulfonic acid ester group, a carbonic acid ester group), an alkylene group (e.g., a methylene group, an ethylene group, a trimethylene group, etc.), an arylene group (e.g., a phenylene group, a phenyleneoxycarbonyl group, etc.), etc., or a combination thereof.

Examples of the foregoing monomer of the general formula (III) are divinylbenzene, ethylene glycol dimethacrylate, propylene glycol dimethacrylate, neopentyl glycol dimethacrylate, tetramethylene glycol diacrylate, tetramethylene glycol dimethacrylate, etc. Among them, divinylbenzene is particularly preferred.

B in the general formula (I) is a monomer unit derived from a copolymerizable ethylenically unsaturated monomer shown by the following general formula (II)

$$CH_2=\underset{}{\overset{R_5}{\overset{|}{C}}}-(L)_m-C\equiv N \qquad (II)$$

wherein $R_5$ represents a hydrogen atom or a lower alkyl group preferably having 1 to about 6 carbon atoms (e.g., a methyl group, an ethyl group, an n-propyl group, an n-butyl group, an n-amyl group, an n-hexyl group, etc.). Among them, a hydrogen atom and a methyl group are particularly preferred. L represents an alkylene group preferably having 1 to about 6 carbon atoms (e.g., a methylene group, an ethylene group, an isopropylene group, a hexylene group, etc.) or an arylene group preferably having 6 to about 10 carbon atoms (e.g., a phenylene group); and m is 0 or 1, preferably 0. B may contain two or more kinds of the foregoing monomer units.

Examples of the ethylenically unsaturated monomers shown by D are ethylene, propylene, 1-butene, isobutene, styrene, α-methylstyrene, vinyltoluene, a monoethylenically unsaturated ester of a fatty acid (e.g., vinyl acetate, allyl acetate, etc.), an ethylenically unsaturated monocarboxylic acid or dicarboxylic acid ester (e.g., methyl methacrylate, ethyl acrylate, n-butyl acrylate, n-butyl methacrylate, n-hexyl methacrylate, n-octyl acrylate, benzyl acrylate, cyclohexyl methacrylate, 2-ethylhexyl acrylate, etc.), a diene (e.g., butadiene, isoprene, etc.), etc. Among them, vinyltoluene, styrene and methyl methacrylate are particularly preferred. D may contain two or more kinds of the foregoing monomer units.

$R_1$ in general formula (I) represents a hydrogen atom or a lower alkyl group preferably having 1 to about 6 carbon atoms (e.g., a methyl group, an ethyl group, an n-propyl group, an n-butyl group, an n-pentyl group, an n-hexyl group, etc.). Among them, a hydrogen atom is particularly preferred. n is an integer of 1 to about 12 and is preferably 1; and $R_2$, $R_3$ and $R_4$, which may be the same or different, each represents an alkyl group preferably having 1 to about 20 carbon atoms or an aralkyl group preferably having 7 to about 20 carbon atoms. At least two of said $R_2$, $R_3$ and $R_4$ may combine with each other to form a heterocyclic structure with a nitrogen atom to result in a saturated or unsaturated 5- to 7-membered ring, preferably a 5- or 6-membered ring, and the heterocyclic structure may further contain one or more hetero atoms such as an oxygen atom and a nitrogen atom.

The term "alkyl group" used in this specification includes substituted alkyl groups in addition to unsubstituted alkyl groups and the term "aralkyl group" similarly includes substituted aralkyl groups in addition to unsubstituted aralkyl groups. Also, other groups in this specification include substituted groups thereof in addition to unsubstituted ones.

That is, the alkyl group in this invention includes unsubstituted alkyl groups such as a methyl group, an ethyl group, an n-propyl group, an isopropyl group, an n-butyl group, an isobutyl group, an n-amyl group, an n-hexyl group, an n-heptyl group, an n-octyl group, a 2-ethylhexyl group, an n-nonyl group, and an n-decyl group and substituted alkyl groups such as an alkoxyalkyl group (e.g., a methoxymethyl group, a methoxyethyl group, a methoxybutyl group, an ethoxyethyl group, an ethoxypropyl group, an ethoxybutyl group, a butoxyethyl group, a butoxypropyl group, a butoxybutyl group, a vinyloxyethyl group, etc.), a cyanoalkyl group (e.g., a 2-cyanoethyl group, a 3-cyanopropyl group, a 4-cyanobutyl group, etc.), a halogenated alkyl group (e.g., a 2-fluoroethyl group, a 2-chloroethyl group, a 3-fluoropropyl group, etc.), an alkoxycarbonylalkyl group (e.g., an ethoxycarbonylmethyl group, etc.), an alkenyl- or alkinyl-substituted alkyl group (e.g., allyl group, a 2-butenyl group, a propargyl group, etc.), etc.

The aralkyl group in this invention includes unsubstituted aralkyl groups such as a benzyl group, a phenethyl group, a diphenylmethyl group, a naphthylmethyl group, etc., and substituted aralkyl groups such as an alkylaralkyl group (e.g., a 4-methylbenzyl group, a 2,5-dimethylbenzyl group, a 4-isopropylbenzyl group, etc.), an alkoxyaralkyl group (e.g., a 4-methoxybenzyl group, a 4-ethoxybenzyl group, a 4-(4-methoxyphenyl)-benzyl group, etc.), a cyanoaralkyl group (e.g., a 4-cyanobenzyl group, a 4-(4-cyanophenyl)benzyl group, etc.), a perfluoroalkoxyaralkyl group (e.g., a 4-pentafluoropropoxybenzyl group, a 4-undecafluorohexoxybenzyl group, etc.), a halogenated aralkyl group (e.g., a 4-chlorobenzyl group, a 4-bromobenzyl group, a 3-chlorobenzyl group, a 4-(4-chlorophenyl)benzyl group, a 4-(4-bromophenyl)benzyl group, etc.), etc.

At least two of $R_2$, $R_3$ and $R_4$ may combine with each other to form a cyclic structure together with a nitrogen atom. As examples of such, there are the case of forming a cyclic structure from $R_2$ and $R_3$, e.g., pyrrolidine, piperidine, morpholine, etc., and in this case $R_4$ is the same as described above and the case of forming a cyclic structure from $R_2$, $R_3$ and $R_4$, e.g., imidazole, 2-methylimidazole, triazole, pyridine, 2-methylpyridine, 3-methylpyridine, 4-methylpyridine, quinuclidine, etc.

Among the groups shown by $R_2$, $R_3$ and $R_4$ described above, a methyl group, an ethyl group, an n-butyl group, an n-hexyl group, a benzyl group and a p-chlorobenzyl group are preferred.

Examples of the anion shown by $X^{\ominus}$ are a halogen ion (e.g., a chlorine ion, a bromine ion, an iodine ion, etc.), an alkyl sulfate ion (e.g., a methyl sulfate ion, an ethyl sulfate ion, etc.), an alkyl or arylsulfonic acid ion (e.g., a methanesulfonic acid ion, an ethanesulfonic acid ion, a benzenesulfonic acid ion, a p-toluenesulfonic acid ion, etc.), an acetic acid ion, a sulfuric acid ion, etc. Among them, a chlorine ion is particularly preferred.

When the mordant used in this invention is a polymer dispersion mordant, w is from 0 to about 10 mol%, preferably from about 0.25 to about 10 mol%, particularly preferably from about 1 mol% to about 5 mol%; x is from about 5 to about 90 mol%, preferably from about 20 to about 70 mol%, y is from 0 to about 80 mol%, preferably from 0 to about 30 mol%, and z is from about 10 to about 95 mol%, preferably from about 30 to about 95 mol%.

When the mordant used in this invention is a polymer mordant, w is preferably 0 mol%, x is from about 20 to about 90 mol%, y is from 0 to about 30 mol%, and z is from about 10 to about 90 mol%.

In general, the polymer mordant according to the present invention can be prepared according to the method described in U.S. Pat. No. 3,958,995.

In more detail, the polymer mordant of this invention shown by general formula (I) can be obtained by emulsion polymerizing the foregoing copolymerizable monomer having at least two ethylenically unsaturated groups (i.e., monomer for the unit A in the formula (I)), the copolymerizable monomer shown by general formula (II) (i.e., monomer for the unit B in the formula (I)), the ethylenically unsaturated monomer (i.e., monomer for the unit D in the formula (I)), and an unsaturated monomer shown by the general formula (IV)

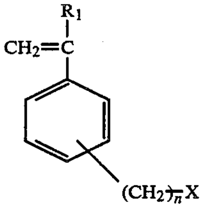

(IV)

wherein $R_1$, n and X have the same meaning as described above (e.g., chloromethylstyrene) and then quaternarizing the emulsion polymerized product with a tertiary amine having the following structure (V)

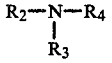

(V)

wherein $R_2$, $R_3$ and $R_4$ have the same meaning as described above (e.g., triethylamine, tri-n-butylamine, tri-n-hexylamine, pyridine, 4-methylpyridine, N-methylpiperidine, N-methylmorpholine, etc.).

Also, the polymer dispersion mordant of this invention shown by general formula (I) can be obtained by emulsion polymerizing the foregoing copolymerizable monomer having at least two ethylenically unsaturated groups (i.e., monomer for the unit A in the formula (I)), the copolymerizable monomer shown by general formula (II) (i.e., monomer for the unit B in the formula (I)), the ethylenically unsaturated monomer (i.e., monomer for the unit D in the formula (I)), and an unsaturated monomer shown by the general formula (VI)

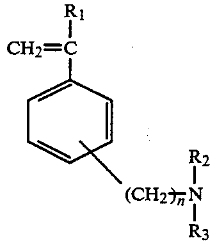

(VI)

wherein $R_1$, $R_2$, $R_3$ and n have the same meaning as described above, (e.g., 4-(N,N-dimethylaminoethyl)styrene, 4-(N,N-diethylaminoethyl)styrene, etc.) and then quaternarizing the emulsion polymerization product by an alkylating agent or an aralkylating agent having the structure $R_4$-X wherein $R_4$ and X have the same meaning as described above. Examples of the alkylating agent are methyl, p-toluenesulfonate, dimethyl sulfate, diethyl sulfate, ethyl bromide, n-propyl bromide, allyl chloride, n-butyl bromide, chloro-2-butene, ethyl chloroacetate, n-hexyl bromide, n-octyl bromide, etc.; and examples of the aralkylating agent are benzyl chloride, benzyl bromide, p-nitrobenzyl chloride, p-chlorobenzyl chloride, p-methylbenzyl chloride, p-isopropylbenzyl chloride, dimethylbenzyl chloride, p-methoxybenzyl chloride, p-pentafluoropropenyloxybenzyl chloride, naphthyl chloride, diphenylmethyl chloride, preferably p-chlorobenzyl chloride and dimethylbenzyl chloride.

The foregoing emulsion polymerization is generally performed in the presence of a radical initiator (e.g., combination use of potassium persulfate and potassium hydrogensulfite) and at least one anionic surface active agent (e.g., Triton 770, trade name, made by Rhom & Haas Co., i.e., sodium salt of an alkyl-aryl poly(ether sulfate)), cationic surface active agent (e.g., cetyltrimethylammonium chloride, stearyltrimethylammonium chloride, etc.) or nonionic surface active agent (e.g., polyvinyl alcohol, etc.).

The foregoing quaternarization reaction is generally performed at a temperature of from 0° C. to about 100° C., preferably 30° C. to 70° C.

The polymer dispersion mordant used in this invention can be very easily produced in one reaction vessel without need of a large amount of solvent.

Practical examples of the polymer dispersion mordant and polymer mordant used in this invention are shown below although the invention is not limited to those materials. The illustrated polymers each contain the following repeating unit at the indicated ratio.

Mordant Unit 1:

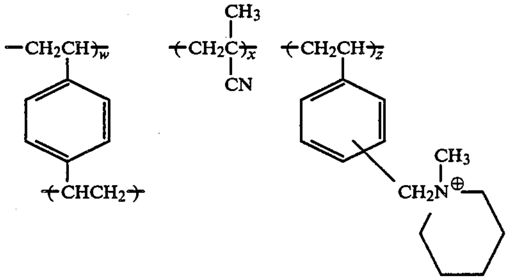

$Cl^{\ominus}$ w:x:z = 5:47.5:47.5

Mordant Unit 2:

-continued

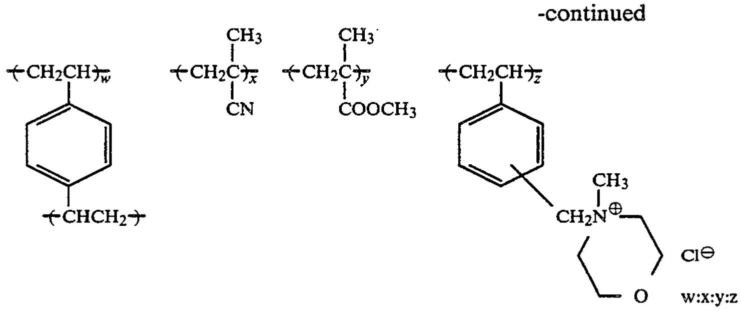

w:x:y:z = 5:60:10:25

Mordant Unit 3:

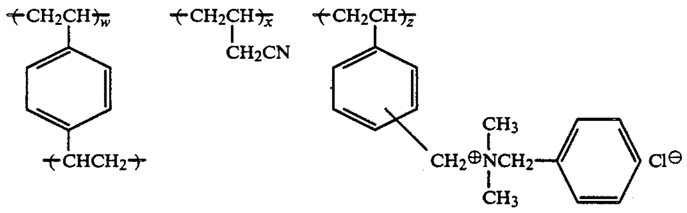

w:x:z = 5:65:30

Mordant Unit 4:

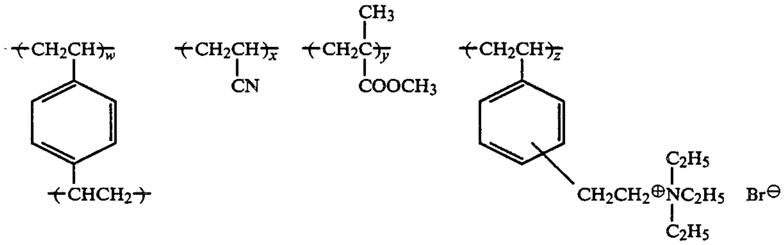

w:z:y:z = 5:50:5:40

Mordant Unit 5:

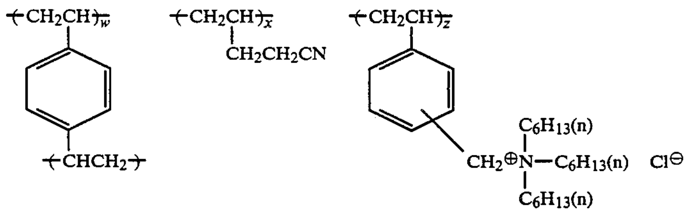

w:x:z = 5:47.5:47.5

Mordant Unit 6:

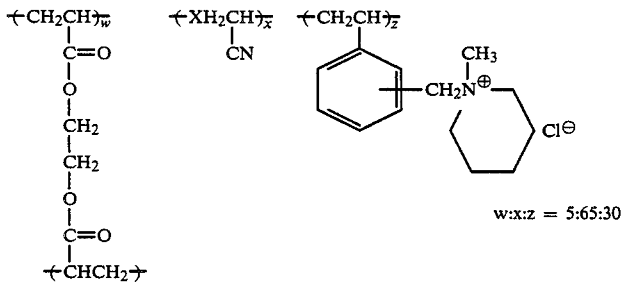

w:x:z = 5:65:30

The polymers according to this invention can be used as a mordant for color diffusion transfer process as well as as a mordant for dyeing antihalation layers as described in U.S. Pat. No. 3,282,699.

The layer of the polymer of this invention may be formed by the polymer alone or may be further contain a natural or synthetic hydrophilic polymer as is generally used in the field of photography, such as gelatin, polyvinyl alcohol, polyvinylpyrrolidone, etc. (preferably, polyvinyl alcohol as the synthetic hydrophilic copolymer). Two or more kinds of the mordants of this invention (for example, a combination of the polymer mordant and the polymer dispersion mordant) may be used in one layer or two or more layers of a same photographic element or the mordant or mordants of this invention may be used together with other mordant or mordants in one layer or two or more layers of a same photographic element.

Furthermore, the polymer mordant of this invention may be used as the excess dye catching mordant layer described in U.S. Pat. No. 3,930,864. Also, as mordants which can be used with the polymer mordants of this invention, there are the mordants described in, for example, U.S. Pat. Nos. 4,131,469 and 4,147,548, Japanese Patent Application Nos. (OPI) 136626/77, 126027/79 and 145529/79.

The amount of the polymer mordant used in this invention can be easily determined according to the amount of a dye or dyes to be mordanted, the kind and composition of the polymer mordant, and further the image-forming process employed but is generally about 20 to about 80% by weight or about 0.5 to about 8 $g/m^2$, preferably about 40 to about 60% by weight or about 1 to about 5 $g/m^2$, of the mordant layer.

Materials other than the mordants in the case of using the photographic element of this invention for a color diffusion transfer process are described below.

When the photographic element of this invention is a photographic film unit for a color diffusion transfer process, that is, a film unit which can be processed by passed through a pair of juxtaposed pressure-applying members, the photographic member is composed of the following elements:

(1) a photosensitive element;

(2) an image-receiving element containing the mordant of this invention;

(3) a developing element comprising a means for releasing an alkaline processing composition in the inside of the film unit, such as, for example, a rupturable container containing, if desired, a silver halide developer; and (4) at least one support.

In one embodiment of the film unit of this invention, a photosensitive element having one or plural silver halide emulsion layers on a support is, after imagewise exposure, superposed on an image-receiving element having at least one mordant layer composed of the polymer mordant of this invention on a support in a face-to-face relationship and then processed by spreading an alkaline processing composition between both elements. Also, it is preferred that the film unit be light-shielded at both sides of the photosensitive element or the film unit when the film unit is withdrawn from a cameral. In this case, the image-receiving element may be peeled off from the photosensitive element or may not be peeled off for observing the image formed as described in U.S. Pat. No. 3,415,645.

In another embodiment of this invention, the support, the image-receiving element, and the photosensitive element in the foregoing film unit are in an integrated form. For example, as is disclosed in Belgian Patent 757,960, the film unit is composed of a transparent support having formed thereon an image-receiving layer containing the polymer mordant of this invention, a substantially opaque light-reflecting layer, e.g., a $TiO_2$ layer and a carbon black layer, and single or plural photosensitive layers. After imagewise exposing the photosensitive layer or layers, an opaque cover sheet is superposed on the photosensitive layer and an alkaline processing composition is spread between both elements.

Another embodiment of an integrated type of the film unit of this invention is disclosed in Belgian Pat. No. 757,959. In this embodiment, an image-receiving layer containing the polymer mordant of this invention, a substantially opaque light-reflecting layer, e.g., the layer as described above, and a single or plural photosensitive layers are formed on a transparent support and further a transparent cover sheet is superposed on the photosensitive layer. A rupturable pod containing an alkaline processing composition containing therein an opacifying agent, e.g., carbon black, is disposed adjacent the uppermost layer of the foregoing photosensitive layer and the transparent cover sheet. Such a film unit is imagewise exposed through the transparent cover sheet and the rupturable container is ruptured by means of a pressure-applying member at the time of withdrawing the film unit from a camera to spread the processing composition containing an opacifying agent over the space between the photosensitive layer and the cover sheet, whereby the film unit is light-shielded and development proceeds. In this case, the photosensitive element need not be integrated with the image-receiving element in the photosensitive element of this invention.

For photosensitive elements in this invention, silver halides and dye image-providing compounds associated with the silver halides are used and the dye image-providing compounds used in this case may be of the negative type or positive type, that is, may be a dye image-providing compound which is initially mobile or immobile in the photosensitive element when the photosensitive element is processed by the alkaline processing composition.

As an example of useful negative type dye image-providing compounds used in this invention, there are couplers capable of forming or releasing a dye by reaction with an oxidized color developing agent. Practical examples of the couplers are described in, for example, U.S. Pat. No. 3,227,550 and Canadian Pat. No. 602,607. As another example of the preferred negative type dye image-providing compounds used in this invention, there are dye-releasing redox compounds capable of releasing a dye by reaction with a developing agent or an electron transfer agent in an oxidized state. Practical examples of the redox compounds are described in, for example, U.S. Pat. Nos. 3,928,312, 4,135,929, 4,055,428, 4,336,322 and 4,053,312.

As immobile positive type dye-providing compounds used in this invention, there are compounds which release a diffusible dye without receiving an electron, i.e., without being reduced, or after receiving at least one electron, i.e., after being reduced, during photographic processing of the photographic element under alkaline conditions. Practical examples of these compounds are described in, for example, U.S. Pat. Nos. 4,199,354, 3,980,479, 4,199,355, 4,139,379, 4,139,389 and 4,232,107 and Japanese Patent Application (OPI) No. 69033/78.

Further, a positive type dye image-providing compound which is mobile in an alkaline photographic processing condition from the first is also useful for the photographic element of this invention. A typical example of such a compound is a dye developing agent. Practical examples thereof are described in, for example, U.S. Pat. Nos. 3,482,972 and 3,880,658.

The dyes formed from the dye image-providing compounds used in this invention may be conventional dyes or dye precursors which can be converted into dyes in a photographic processing step or an additional processing step. Also, the dyes of the final images may be or may not be in the form of metal complexes. As typical dye structures useful for this invention, there are azo dyes, azomethine dyes, anthraquinone dyes, and phthalocyanine dyes as well as metal complexes of these dyes. Among these dyes, cyan dyes, magenta dyes, and yellow dyes are particularly important.

Practical examples of yellow dye image-providing compounds used in this invention are described in U.S. Pat. Nos. 3,597,200, 3,309,199, 4,013,633, 4,245,028, 4,156,609, 4,139,383, 4,195,992, 4,148,641 and 4,148,643, Japanese Patent Applications (OPI) 114930/76, 16130/81 and 71072/81, *Research Disclosure,* 17630 (1978), and ibid., 16475 (1977).

Examples of magenta dye image-providing compounds used in this invention are given in U.S. Pat. Nos. 3,453,107, 3,544,545, 3,932,380, 3,931,144, 3,932,308, 3,954,476, 4,233,237, 4,255,509, 4,250,246, 4,142,891, 4,207,104 and 4,287,292, Japanese Patent Applications (OPI) Nos. 106727/77, 23628/78, 36804/80, 73057/81, 71060/81 and 134/80.

Examples of cyan dye image-providing compounds used in this invention are given in U.S. Pat. Nos. 3,482,972, 3,929,760, 4,013,635, 4,268,625, 4,171,220, 4,242,435, 4,142,891, 4,195,994, 4,147,544 and 4,148,642, British Pat. No. 1,551,138, Japanese Patent Application Nos. (OPI) 99431/79, 8827/77, 47823/78, 143323/78, 99431/79 and 71061/81, European Patents (EPC) Nos. 53,037 and 53,040, *Research Disclosure,* 17630 (1978) and ibid., 16475 (1977).

Also, a dye-releasing redox compound having a dye moiety temporarily shifting the light absorption thereof to a shorter wavelength side in a photosensitive element may be used. Practical examples of the redox compounds are described in U.S. Pat. Nos. 4,310,612, 3,336,287, 3,579,334 and 3,982,946, Defensive Publication T-999,003, British Pat. No. 1,467,317, and Japanese Patent Application (OPI) No. 158638/82 as types of dye precursors.

A process of obtaining color diffusion transfer images using dye-releasing redox compounds useful herein is also described in *Photographic Science and Engineering,* Vol. 20, No. 4, pages 155-164, July/August, 1976.

In the above-described process, any silver halide developing agents which can cross-oxidizing the dye-releasing redox compounds can be used. Such developing agents may be present in an alkaline processing composition or in an appropriate layer of the photographic element of this invention.

Examples of the developing agents which can be used in this invention are hydroquinones as described in Japanese Patent Application (OPI) No. 16131/81, aminophenols, phenylenediamines, and pyrazolidinones (e.g., phenidone, 1-phenyl-3-pyrazolidinone, dimeson (i.e., 1-phenyl-4,4-dimethyl-3-pyrazolidinone), 1-p-tolyl-4-methyl-4-oxymethyl-3-pyrazolidinone, 1-(4'-methoxyphenyl)-4-methyl-4-oxymethyl-3-pyrazolidinone, 1-phenyl-4-methyl-4-oxymethyl-3-pyrazolidinone, etc.).

Of the silver halide developers described above, black-and-white developing agents (in particular, pyrazolidinones) generally have a property of reducing the formation of stain in an image-receiving layer and are particularly more preferred than color developing agents such as phenylenediamines.

The processing composition used for processing the photographic elements of this invention contains a base such as sodium hydroxide, potassium hydroxide, sodium carbonate, sodium phosphate, etc., and it is appropriate that the pH of the processing composition be higher than about 9, preferably higher than about 11.5. The processing composition may further contain an anti-oxidant such as sodium sulfite, an ascorbate, piperidinohexose reductone, etc., or a silver ion concentration adjusting agent such as potassium bromide, etc. Furthermore, the processing composition may contain a viscosity increasing compound such as hydroxyethyl cellulose, sodium carboxymethyl cellulose, etc.

Still further, the alkaline processing composition may contain a compound having an action of accelerating development or diffusion of a dye, such as benzyl alcohol, etc.

The photographic element of this invention comprises a support which does not undergo severe dimensional change during processing. Examples of such a support are a cellulose acetate film, a polystyrene film, a polyethylene terephthalate film, a polycarbonate film, etc. Other examples of effective supports are paper or a paper laminated with a water-impermeable polymer such as polyethylene.

One of the features of this invention is that the mordant having the above-described repeating unit shown by general formula (I) can strongly retain a dye. Furthermore, the mordant of this invention not only has the property of retaining a dye but it is also an important feature of this invention that the dye thus mordanted by the mordant of this invention shows low chemical change or decomposition by the action of light. Accordingly, the dyes thus mordanted can be stably stored for a long period of time.

The above-described features of this invention are particularly remarkable when the mordant of this invention is the polymer dispersion mordant.

SYNTHESIS EXAMPLE 1

Synthesis of a Polymer Dispersion of Poly(divinylbenzene-co-methacrylonitrile-co-chloromethylstyrene):

In a reaction vessel was placed 300 ml of distilled water and after degassing the vessel with nitrogen gas and heating the vessel to 50° C. under a nitrogen atmosphere, 6 ml of Triton 770, 45.0 g (0.32 mol) of chloromethylstyrene, 4.0 g (0.06 mol) of methacrylonitrile, and 2.6 g (0.02 mol) of divinylbenzene were added to the distilled water. Then, 1.00 g of potassium persulfate added to 20 ml of distilled water degassed with nitrogen gas and 0.38 g of sodium hydrogensulfite added to 10 ml of distilled water degassed with nitrogen gas were simultaneously added to the mixture followed by stirring at 50° C. for 5 hours. Thereafter, the abovedescribed mixture was cooled to room temperature and filtered to provide a polymer dispersion (latex) (grain size: about 0.05$\mu$ to 0.06$\mu$). The polymer thus obtained had the repeating unit shown by the formula:

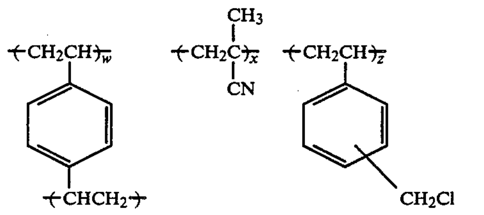

w:x:z = 5:30:65

SYNTHESIS EXAMPLE 2

Synthesis of a Polymer Dispersion of Poly(divinylbenzene-co-methacrylonitrile-co-N-methyl-N-vinylbenzylpiperidinium Chloride):

In a reaction vessel were placed 150 g of the latex having a solid component concentration of 14.0% prepared in Synthesis Example 1 and 50 g of distilled water and then 10.2 g of N-methylpiperidine was added thereto at room temperature. Thereafter, the mixture was heated to 70° C. and stirred for about 3 hours. The mixture was cooled to room temperature and filtered to provide the desired polymer dispersion mordant (grain size: about 0.1μ).

SYNTHESIS EXAMPLE 3

Various polymers having the repeating units shown by the following general formula wherein the kind of nitrile monomer, the substituents attached to the quaternary nitrogen atom, and the ratio of each unit were changed as shown in Table 1 were synthesized (grain size: about 0.1μ).

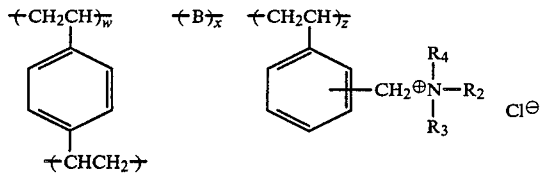

TABLE 1

| Polymer No. | B | w | x | z | $R_2$ | $R_3$ | $R_4$ |
|---|---|---|---|---|---|---|---|
| 3 | Methacrylonitrile | 5 | 65 | 30 | $-(CH_2)_5-$ | | $-CH_3$ |
| 4 | " | 5 | 30 | 65 | $-CH_2CH_2OCH_2CH_2-$ | | $-CH_3$ |
| 5 | " | 5 | 65 | 30 | $-CH_2CH_2OCH_2CH_2-$ | | $-CH_3$ |
| 6 | " | 5 | 47.5 | 47.5 | $-C_6H_{13}$ | $-C_6H_{13}$ | $-C_6H_{13}$ |
| 7 | " | 5 | 47.5 | 47.5 | $-CH_3$ | $-CH_3$ | $-CH_2C_6H_5$ |
| 8 | Acrylonitrile | 5 | 65 | 30 | $-(CH_2)_5-$ | | $-CH_3$ |
| 9 | " | 5 | 65 | 30 | $-CH_2CH_2OCH_2CH_2-$ | | $-CH_3$ |
| 10 | " | 5 | 47.5 | 47.5 | $-C_6H_{13}$ | $-C_6H_{13}$ | $-C_6H_{13}$ |
| 11 | " | 5 | 47.5 | 47.5 | $-CH_3$ | $-CH_3$ | $-CH_2C_6H_5$ |

The following example is intended to illustrate this invention but not to limit it in any way.

EXAMPLE

Nine kinds of photosensitive sheets were prepared each by coating, in succession, the following layers on a transparent polyethylene terephthalate film support:

(1) A mordant layer containing 3.0 g/m$^2$ of the polymer mordant (each of Polymer Nos. (3), (4), (5), (6), (7), (8), (9), (10) and (11) shown in Table 1 above) and 3.0 g/m$^2$ of gelatin.

(2) A light reflecting layer containing 20 g/m$^2$ of titanium dioxide and 2.0 g/m$^2$ of gelatin.

(3) A light shielding layer containing 3.0 g/m$^2$ of carbon black and 2.0 g/m$^2$ of gelatin.

(4) A layer containing 0.44 g/m$^2$ of a cyan dye-releasing redox compound having the following structure, 0.90 g/m$^2$ of tricyclohexyl phosphate, and 0.8 g/m$^2$ of gelatin.

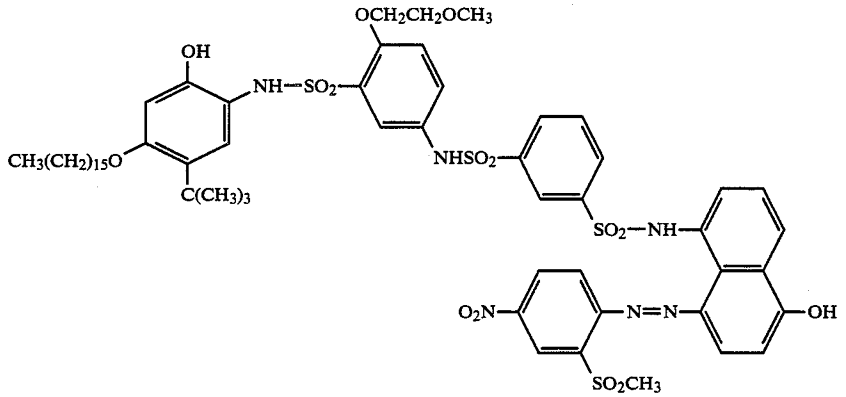

(5) A layer containing 1.03 g/m$^2$ (as the amount of silver) of a red-sensitive internal latent image type direct reversal silver bromide emulsion (grain size: 1μ), 1.2 g/m$^2$ of gelatin, 0.05 mg/m$^2$ of a nucleating agent having the following structure, and 0.13 g/m$^2$ of 2-sulfo-5-n-pentadecylhydroquinone sodium salt.

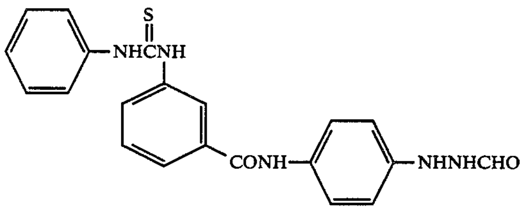

(6) A color mixing preventing agent-containing layer containing 0.8 $g/m^2$ of gelatin, 1.0 $g/m^2$ of 2,5-di-t-pentadecylhydroquinone, and 1.0 $g/m^2$ of polymethyl methacrylate.

(7) A layer containing 0.21 $g/m^2$ of a magenta dye-releasing redox compound having the following structure I, 0.11 $g/m^2$ of a magenta dye-releasing redox compound having the following structure II, 0.08 $g/m^2$ of tricyclohexyl phosphate, and 0.9 $g/m^2$ of gelatin.

1.1 $g/m^2$ of gelatin, 0.04 $mg/m^2$ of the nucleating agent as used for layer (5), and 0.07 $g/m^2$ of 2-sulfo-5-n-pentadecylhydroquinone sodium salt.

(12) A layer containing 1.0 $g/m^2$ of gelatin.

A cover sheet was prepared by coating, in succession, following layers (1') to (3') on a transparent polyester film support:

(1') A layer containing 22 $g/m^2$ of a copolymer of acrylic acid and butyl acrylate (80:20 by weight ratio) and 0.44 $g/m^2$ of 1,4-bis(2,3-epoxypropoxy)butane.

(2') A layer containing 3.8 $g/m^2$ of acetyl cellulose (forming 39.4 g of an acetyl group upon hydrolysis of 100 g of acetyl cellulose), 0.2 $g/m^2$ of a copolymer (molecular weight (weight average) of about 50,000) of styrene and maleic anhydride (60:40 by weight ratio), and 0.115 $g/m^2$ of 5-(β-cyanoethylthio)-1-phenyltetrazole.

(3') A layer containing 2.5 $g/m^2$ of a copolymer latex of vinylidene chloride, methyl acrylate, and acrylic acid (85:12:3 weight ratio) (latex size: 0.6 to 0.8μ) and 0.05

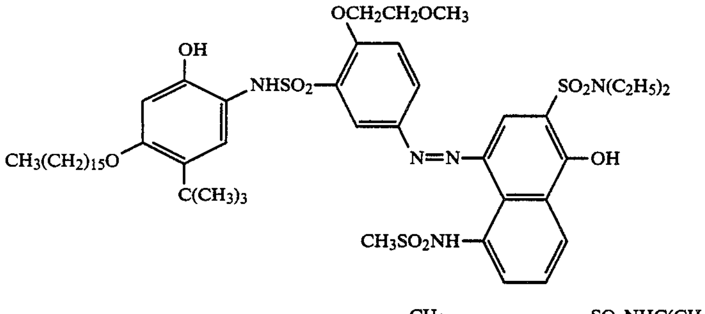

Structure I

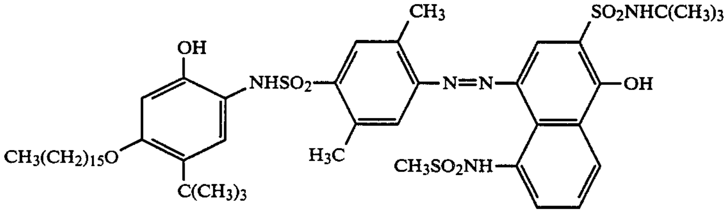

Structure II (8) A layer containing 0.82 $g/m^2$ (as the amount of silver) of a green-sensitive internal latent image type direct reversal silver bromide emulsion (grain size: 1μ), 0.9 $g/m^2$ of gelatin, 0.03 $mg/m^2$ of the nucleating agent as used for layer (5), and 0.08 $g/m^2$ of 2-sulfo-5-n-pentadecylhydroquinone sodium salt.

(9) Same as layer (6).

(10) A layer containing 0.53 $g/m^2$ of a yellow dye-releasing redox compound having the following structure, 0.13 $g/m^2$ of tricyclohexyl phosphate, and 0.7 $g/m^2$ of gelatin.

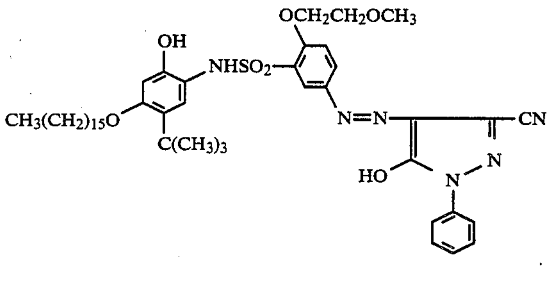

(11) A layer containing 1.09 $g/m^2$ (as the amount of silver) of a blue-sensitive internal latent image type direct reversal silver bromide emulsion (grain size: 1μ), $g/m^2$ of a polymethyl methacrylate latex (particle sizes of 1–3 μm).

On the other hand, for comparison, three comparison photosensitive sheets were prepared by following the same procedure as in the case of preparing the photosensitive sheets of this invention except that the following known quaternarized polymers were used in place of the polymer mordants in layer (1).

The quaternarized polymers used for the comparison samples were (1) poly(N-vinylbenzyl-N-methylpiperidinium chloride-co-styrene-co-divinylbenzene), (2) poly(N-benzyl-N,N-dimethyl-N-vinylbenzylammonium chloride-co-styrene-co-divinylbenzene), and (3) poly(N,N,N-trihexyl-N-vinylbenzylammonium chloride-co-styrene-co-divinylbenzene).

Each of the photosensitive sheets thus prepared was imagewise exposed through a continuous wedge to tungsten light (2,854° K.) converted into 4,800° K. through a Davis-Gibson filter; the maximum exposure amount in this case was 10 CMS.

The photosensitive sheets thus exposed were developed with the following processing composition at room temperature.

| Processing Composition A: | |
|---|---|
| 1-Phenyl-4-hydroxymethyl-4-methyl-3-pyrazolidinone | 12 g |
| Methylhydroquinone | 0.3 g |
| 5-Methylbenzotriazole | 3.5 g |
| Sodium Sulfite (anhydrous) | 0.2 g |
| Carboxymethyl Cellulose.Sodium Salt | 43 g |
| Potassium Hydroxide | 56 g |
| Benzyl Alcohol | 1.5 ml |
| Carbon Black | 150 g |
| Water to make | 1 kg |

After preparing the above-described processing composition A, each of the photosensitive sheets was superposed on the cover sheet described above and the processing composition was uniformly spread between the photosensitive sheet and the cover sheet at a thickness of 80 μm at 25° C. by passage through a pair of juxtaposed rollers.

The transferred images thus obtained were allowed to dry for 2 weeks at 40° C. and 30% RH in the form of a mono-sheet and then irradiated by a xenon lamp at 100,000 lux for 4 hours from the photosensitive sheet side.

The reduction of the density by the irradiation, with the reflection density of the transferred image before the irradiation being 1.0, is shown in Table 2 below.

From the results shown in Table 2, it can be understood that the reduction of density is low and light fastness is improved in the case of using the mordants of this invention.

TABLE 2

| | Mordant in Photosensitive Sheet | Cyan | Magenta |
|---|---|---|---|
| (1) | Polymer (3) | 0.14 | 0.10 |
| | Polymer (8) | 0.13 | 0.11 |
| | Polymer (4) | 0.12 | 0.09 |
| | Polymer (5) | 0.13 | 0.12 |
| | Polymer (9) | 0.12 | 0.10 |
| | Comparison Sheet (1)* | 0.20 | 0.20 |
| (2) | Polymer (7) | 0.15 | 0.12 |
| | Polymer (11) | 0.14 | 0.13 |
| | Comparison Sheet (2)* | 0.23 | 0.30 |
| (3) | Polymer (6) | 0.18 | 0.12 |
| | Polymer (10) | 0.17 | 0.18 |
| | Comparison Sheet (3)* | 0.35 | 0.46 |

*Comparison sheets (1), (2) and (3) are the comparison photosensitive sheets each containing the above-described quaternarized polymer (1), (2) or (3), respectively.

While the invention has been described in detail and with reference to specific embodiments thereof, it will be apparent to one skilled in the art that various changes and modifications can be made therein without departing from the spirit and scope thereof.

What is claimed is:

1. A photographic element having at least one layer containing a copolymer mordant having the repeating unit represented by the following general formula (I)

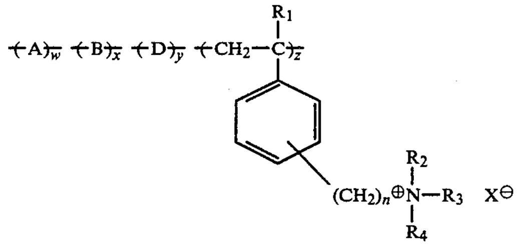

(I)

wherein A represents a monomer unit (copolymer component) derived from a copolymerizable monomer having at least two ethylenically unsaturated groups; B represents a monomer unit (copolymer unit) derived from a copolymerizable ethylenically unsaturated monomer represented by the following general formula (II)

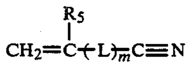

(II)

wherein $R_5$ represents a hydrogen atom or a methyl group; L represents an alkylene group or an arylene group; and m is 0; D represents a monomer unit (copolymer component) derived from a copolymerizable ethylenically unsaturated monomer, other than the monomer units shown by A and B and the monomer unit having component ratio z, and being selected from the group consisting of ethylene, propylene, 1-butene, isobutene, styrene, α-methylstryrene, vinyltoluene, a monoethylenically unsaturated ester of a fatty acid, an ethylenically unsaturated monocarboxylic acid or dicarboxylic acid ester, or a diene; $R_1$ represents a hydrogen atom or a lower alkyl group; $R_2$, $R_3$ and $R_4$, which are the same or different, each represents an alkyl group or an aralkyl group or $R_2$, $R_3$ and $R_4$, which are the same or different, each represents an alkyl group or an aralkyl group and at least two of $R_2$, $R_3$ and $R_4$ combine to form a pyrrolidine, piperidine or morpholine with a nitrogen atom; n represents an integer of from 1 to about 12; $X^{\ominus}$ represents an anion; w represents 0 to about 10 mol%; x represents from about 5 to about 90 mol%; y represents from 0 to about 80 mol%; and z represents from about 10 to about 95 mol%.

2. The photographic element as claimed in claim 1, wherein A in general formula (I) is a monomer unit derived from the monomer having the structure represented by the general formula (III)

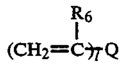

(III)

wherein $R_6$ represents a hydrogen atom or a methyl group; Q represents a linkage group; and l represents an integer of 2 or more.

3. The photographic element as claimed in claim 1, wherein D in general formula (I) is a monomer unit derived from vinyltoluene, styrene or methyl methacrylate.

4. The photographic element as claimed in claim 1, wherein $X^{\ominus}$ in general formula (I) is a halogen ion, an alkylsulfate ion, an alkylsulfonate ion, an arylsulfonate ion, an acetate ion, or a sulfate ion.

5. The photographic element as claimed in claim 1, wherein $X^{\ominus}$ is a chlorine ion.

6. The photographic element as claimed in claim 1, wherein said photographic element comprises (1) a photosensitive element, (2) an image-receiving element having a mordant layer composed of the copolymer mordant having the repeating unit represented by general formula (I), (3) an alkaline processing composition contained in a rupturable container in such a manner that the processing composition can be spread between the photosensitive element and the image-receiving element or a cover sheet superimposed on the photosensitive element after imagewise exposing the photosensitive element, and (4) at least one support.

7. The photographic element as claimed in claim 6, wherein said photosensitive element and image-receiving element are formed on the same support.

8. The photographic element as claimed in claim 6, wherein said photosensitive element and image-receiving element are formed on different supports, respectively.

9. The photographic element as claimed in claim 2, wherein the linkage group represented by Q is an amide group, an ester group, an alkylene group, an arylene group, or a combination thereof.

10. The photographic element as claimed in claim 2, wherein the monomer represented by the general formula (III) is divinylbenzene, ethylene glycol dimethacrylate, propylene glycol dimethacrylate, neopentyl glycol dimethacrylate, tetramethylene glycol diacrylate, or tetramethylene glycol dimethacrylate.

11. The photographic element as claimed in claim 1, wherein $R_2$, $R_3$ and $R_4$, which may be the same or different, each represents a methyl group, an ethyl group, an n-butyl group, an n-hexyl group, a benzyl group, or a chlorobenzyl group.

12. The photographic element as claimed in claim 1, wherein the copolymer mordant is a polymer dispersion mordant represented by the general formula (I) wherein w ranges from 0.25 to 10 mol%, x ranges from 20 to 70 mol%, y ranges from 0 to 30 mol% and z ranges from 30 to 95 mol%.

13. The photographic element as claimed in claim 1, wherein the copolymer mordant is a polymer mordant which may be used as a solution of an organic solvent or water and represented by the general formula (I) wherein w is 0 mol%, x ranges from 20 to 90 mol%, y ranges from 0 to 30 mol% and z ranges from 10 to 90 mol%.

* * * * *